United States Patent [19]

Diana et al.

[11] 3,891,674
[45] June 24, 1975

[54] ESTERS OF ARYL-ALIPHATIC ALCOHOLS

[75] Inventors: Guy D. Diana, Stephentown; William B. Hinshaw, Jr., Sand Lake, both of N.Y.

[73] Assignee: Sterling Drug Inc., New York, N.Y.

[22] Filed: Jan. 17, 1973

[21] Appl. No.: 324,543

[52] U.S. Cl. ............ 260/340.5; 424/278; 424/308; 260/240 R; 260/348 A; 260/488 CD; 260/515 R; 260/591; 260/618 H; 260/649 R
[51] Int. Cl. ............................................ C07d 13/10
[58] Field of Search ......... 260/240 R, 348 A, 340.5, 260/488 CD, 515 R

[56] References Cited
FOREIGN PATENTS OR APPLICATIONS
1,019,348   2/1966   United Kingdom............ 260/29.1 R

OTHER PUBLICATIONS

Closson et al., Tetrahedron Letters, No. 48, pages 6015–6020 (1966) Ansell et al., J. Chem. Soc. 1956, pages 1238 to 1242.

Colonge et al., Bull. Soc. Chim. France, 1963, pages 1799 to 1802.

*Primary Examiner*—John D. Randolph
*Attorney, Agent, or Firm*—Thomas L. Johnson; B. Woodrow Wyatt

[57] ABSTRACT

Esters of aryl-aliphatic alcohols, useful as antiviral agents and insecticides, are prepared by reacting an arylalkyl or arylalkenyl iodide with an alkali metal salt of the appropriate acid.

7 Claims, No Drawings

ESTERS OF ARYL-ALIPHATIC ALCOHOLS ORGANIC COMPOUNDS AND THEIR PREPARATION

This invention relates to esters of aryl-aliphatic alcohols and to the preparation thereof.

The compounds of the invention are of the structural formula

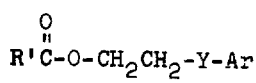

I wherein

Y is selected from the group consisting of:

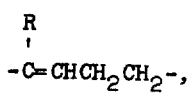

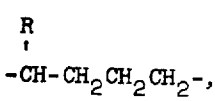

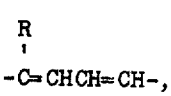

and 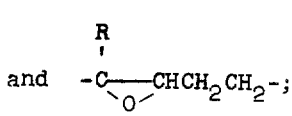

R' is hydrogen, 3,4-methylenedioxyphenyl or a saturated or mono-olefinic hydrocarbon moiety having from 1 to 10 carbon atoms, R' being mono-olefinic only when Y is other than

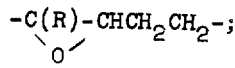

R is hydrogen or lower-alkyl of 1 to 4 carbon atoms; and

Ar is phenyl substituted by 3,4-methylenedioxy or one or two monovalent substituents selected from the group consisting of lower-alkoxy of 1 to 4 carbon atoms, carbo-lower-alkoxy of 2 to 4 carbon atoms, halogen, trifluoromethyl and trifluoromethoxy.

The carbon chains of R, R' and Ar substituents can be straight or branched, although primary or secondary alkyl moieties are preferred.

When R is a saturated or mono-olefinic hydrocarbon moiety having from 1 to 10 carbon atoms, it includes alkyl, alkenyl, cycloalkyl, cycloalkenyl, and combinations thereof such as alkylcycloalkyl, alkylcycloalkenyl, alkenylcycloalkyl, and the like.

When two monovalent substituents are present on the phenyl ring of Ar, they can be the same or different.

Intermediates for the compounds of the invention are prepared as described in the following reaction sequences.

Reaction Sequence A

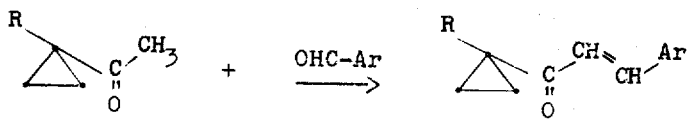

II                    III

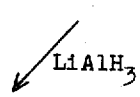

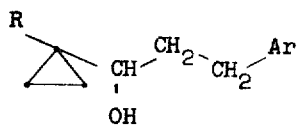

IV

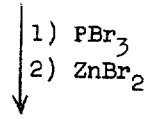

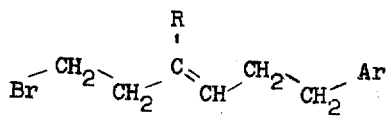

V

Reaction Sequence A — Continued

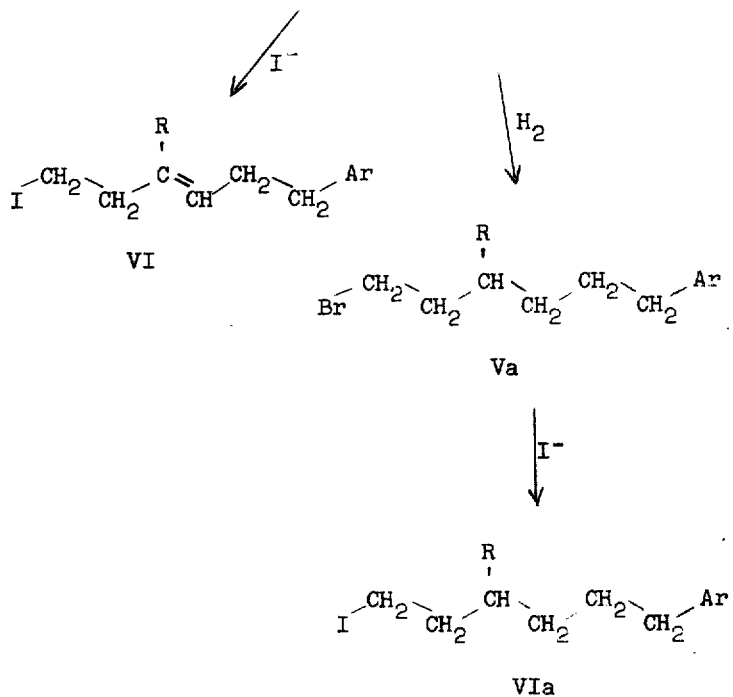

In the foregoing Reaction Sequence A, a 1-R-1-acetylcyclopropane of formula II, where R has the meaning given hereinabove, is treated with an aldehyde ArCHO in the presence of a base to give the arylvinyl 1-R-cyclopropyl ketone of formula III. The latter, when treated with lithium aluminum hydride is reduced at both the carbonyl group and the olefinic linkage to give an arylethyl 1-R-cyclopropyl carbinol of formula IV. This carbinol is then treated with phosphorus tribromide in the presence of a metal bromide such as lithium bromide to replace the hydroxy group by bromine, which product is then treated with zinc bromide to effect ring opening to form an arylalkenyl bromide of formula V. The latter with a metallic iodide is converted to the corresponding iodide of formula VI. If a compound with a saturated alkylene chain is desired the unsaturated bromide of formula V is hydrogenated in the presence of palladium or platinum oxide catalyst to produce a saturated bromide of formula Va, which is in turn converted to the corresponding iodide VIa.

Reaction Sequence B

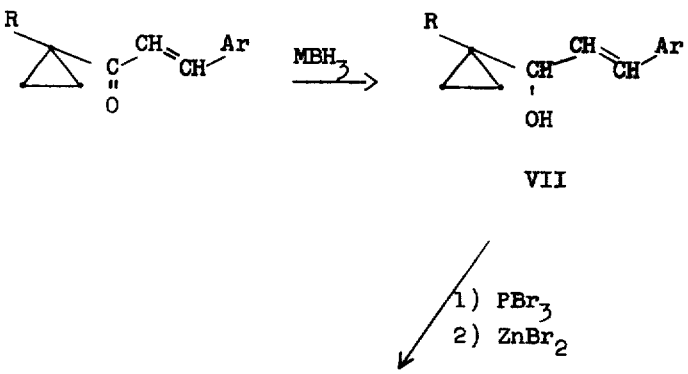

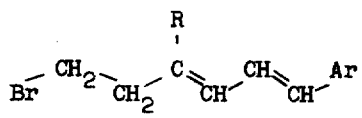

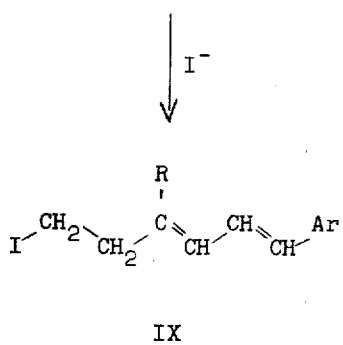

IX

In Reaction Sequence B the arylvinyl 1-R-cyclopropyl ketone of formula III is treated with an alkali metal borohydride, preferably sodium borohydride to reduce the carbonyl group but not the olefinic linkage and provide an arylvinyl 1-R-cyclopropyl carbinol of formula VII. By procedures analogous to those shown in Reaction Sequence A, the carbinol of formula VII is treated with phosphorus tribromide in the presence of a metal bromide and then with zinc bromide to give a diunsaturated aralkyl bromide of formula VIII. The latter is then converted to the corresponding iodide (IX).

The compounds of formula I, where Y is $-C(R)=CHCH_2CH_2-$, $-CH(R)CH_2CH_2CH_2-$, or $-C(R)=CHCH=CH-$, can be prepared from the intermediates described above according to the following method:

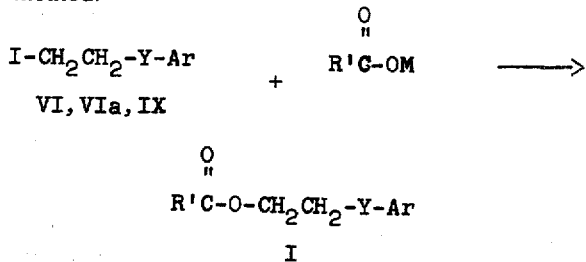

An arylalkyl iodide of formula VIa or an arylalkenyl iodide of formula VI or IX is reacted with an alkali metal salt of an acid R'COOM where M is an alkali metal and R', Y and Ar have the meanings given hereinabove. The reaction takes place in an inert organic solvent at a temperature between about 30°C. and 100°C.

The compounds of formula I where Y is

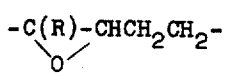

can be obtained by treating the compounds of formula I where Y is $-C(R)=CHCH_2CH_2-$ with a peroxide, e.g. hydrogen peroxide, t-butylhydroperoxide, or a peracid such as m-chloroperbenzoic acid, p-nitroperbenzoic acid, peracetic acid, perbenzoic acid, permaleic acid or perphthalic acid. The reaction takes place in an inert organic solvent at ambient temperature.

Biological evaluation of the compounds of the invention has shown that they possess antiviral activity. They have been found to be effective in vitro against one or more of a variety of viruses, including rhino-2, equine rhino, para-influenza and respiratory syncitial virus at minimal growth inhibitory concentrations (mic) ranging from about 0.5 to about 50 micrograms per milliliter. The mic values were determined by standard serial dilution procedures.

The compounds of the invention have also been found to possess pesticidal activity against arthropod species, as indicated by tests under simulated field conditions in a greenhouse against one or more of the following pest species: yellow mealworm pupae, dock beetle larvae, cabbage looper larvae, yellow fever mosquito larvae, rhodnius prolixus nymph, dock beetle eggs and salt marsh caterpillar eggs.

The structures of the compounds of the invention were established by the modes of synthesis, by elementary analysis, and by infrared and nuclear magnetic resonance spectral determinations.

A further aspect of the invention relates to compositions for combatting arthropods by hindering the maturation thereof which comprise an effective amount of at least one compound of formula I in admixture with a suitable carrier or diluent, and to the method of combatting arthropods at any stage of their development by contacting them with said compositions.

The compositions of the invention are effective against insects at any stage of their development short of the final adult form, i.e. at the egg, larval or pupal stages. The compounds can be formulated in conventional manner as solutions, emulsions, suspensions, dusts and aerosol sprays. The pesticide compositions of the invention can contain adjuvants found normally in such preparations, including water and/or organic solvents such as acetone, dimethylformamide, sesame oil, petroleum oils, and the like. Emulsifying and surface active agents may also be added. Dust formulations can contain talc, diatomaceous earth, kaolin, bentonite, calcium carbonate, wood, flour, cork, carbon, and the like. The aerosol sprays contain propellants such as dichlorodifluoromethane. The compounds of this invention can be employed as the sole pesticide component or they can be used in admixture with other compounds having similar utility. While the concentration of active ingredient can vary within rather wide limits, ordinarily the pesticide will comprise not more than about 10%, and preferably about 1% by weight of the composition.

A still further aspect of the invention relates to compositions for combatting viruses which comprise an antivirally effective amount of at least one compound of formula I in admixture with a suitable carrier or diluent, and to the method of combatting viruses by contacting the locus of said viruses with said compositions.

The antiviral compositions are formulated by preparing a dilute solution or suspension in an organic or aqueous-organic medium, for example ethyl alcohol, acetone, dimethylsulfoxide, and the like; and are applied to the locus to be disinfected by conventional means such as spraying, swabbing or immersing. Alternatively, the compounds can be formulated as ointments or creams by incorporating them in conventional ointment or cream bases, such as alkylpolyether alcohols, cetyl alcohol, stearyl alcohol and the like; as jellies by incorporating them in conventional jelly bases such as glycerin and tragacanth; or as aerosol sprays or foams.

The following examples will further illustrate the invention.

PREPARATION OF INTERMEDIATES

A. 2-Arylvinyl cyclopropyl ketones (III)

A1. 2-(3,4-Methylenedioxyphenyl)vinyl 1-ethylcyclopropyl ketone [III; Ar is 3,4-methylenedioxyphenyl, R is $C_2H_5$]. A mixture of 33.6 g. (0.3 mole) of 1-ethylcyclopropyl methyl ketone and 45 g. (0.3 mole) of piperonal in 21 ml. of ethanol was stirred at room temperature, and 21 ml. of 20% aqueous sodium hydroxide was added dropwise over a period of 30–45 minutes. The mixture was warmed at 40°–60°C. for 3 hours with stirring. The solution was then cooled to 0°–10°C., 0.2 ml. of glacial acetic acid added, and the mixture was extracted with ether. The ether extracts were concentrated, and the residue dissolved in 200 ml. of 95% ethanol, which solution when cooled caused separation of a solid product. The latter was recrystallized from 150 ml. of methanol to give 39 g. of 2-(3,4-methylenedioxyphenyl)vinyl 1-ethylcyclopropyl ketone, m.p. 62°–64°C.

A2. 2-(3,4-Methylenedioxyphenyl)vinyl cyclopropyl ketone [III; Ar is 3,4-methylenedioxyphenyl, R is H] was prepared from 8.4 g. of cyclopropyl methyl ketone and 15 g. of piperonal according to the procedure described above in Preparation A1, affording 21.5 g., m.p. 85°–87°C. when recrystallized from ethanol.

A3. 2-(3,4-Methylenedioxyphenyl)vinyl 1-methylcyclopropyl ketone [III; Ar is 3,4-methylenedioxyphenyl, R is $CH_3$] was prepared from 25.6 g. of 1-methylcyclopropyl methyl ketone and 39.3 g. of piperonal according to the procedure described above in Preparation A1, affording 29.5 g. of crystalline product.

A4. 2-(3,4-Dimethoxyphenyl)vinyl 1-ethylcyclopropyl ketone [III; Ar is 3,4—$(CH_3O)_2C_6H_3$, R is $C_2H_5$] was prepared from 22.4 g. of 1-ethylcyclopropyl methyl ketone and 33.2 g. of veratraldehyde according to the procedure described above in Preparation A1, affording 20.3 g., b.p. 156°–158°C. (0.02 mm.).

A5. 2-(4-Methoxyphenyl)vinyl cyclopropyl ketone [III; Ar is 4—$CH_3OC_6H_4$, R is H] was prepared from 84.1 g. of cyclopropyl methyl ketone and 136 g. of p-methoxybenzaldehyde according to the procedure described above in Preparation A1, affording 173.5 g., m.p. 70°–72°C. when recrystallized from ethanol.

A6. 2-(4-Chlorophenyl)vinyl cyclopropyl ketone [III; Ar is 4—$ClC_6H_4$, R is H] was prepared from 25.2 g. of cyclopropyl methyl ketone and 42 g. of p-chlorobenzaldehyde according to the procedure described above in Preparation A1, affording 31 g., m.p. 63°–65°C. when recrystallized from ethanol.

A7. 2-(4-Carboxyphenyl)vinyl 1-ethylcyclopropyl ketone [III; Ar is 4—$HO_2CC_6H_4$, R is $C_2H_5$] was prepared from 67.2 g. of 1-ethylcyclopropyl methyl ketone and 90 g. of p-carboxybenzaldehyde according to the procedure described above in Preparation A1, affording 40 g., m.p. 183.5°–184.5°C. when recrystallized from acetonitrile and then repeatedly from isopropyl alcohol.

By following the procedure of Preparation A1 above, 1-isopropylcyclopropyl methyl ketone or 1-butylcyclopropyl methyl ketone can be caused to react with piperonal to give 2-(3,4-methylenedioxyphenyl)vinyl 1-isopropylcyclopropyl ketone [III; Ar is 3,4-methylenedioxyphenyl, R is $(CH_3)_2CH$], or 2-(3,4-methylenedioxyphenyl)vinyl 1-butylcyclopropyl ketone [III; Ar is 3,4-methylenedioxyphenyl, R is $CH_3CH_2CH_2CH_2$], respectively.

By following the procedure of Preparation A1 above, cyclopropyl methyl ketone can be caused to react with 3,4-dichlorobenzaldehyde, 2,4-dichlorobenzaldehyde, 4-bromobenzaldehyde, 4-fluorobenzaldehyde, 4-trifluoromethoxybenzaldehyde or 4-trifluoromethylbenzaldehyde to give, respectively:

2-(3,4-dichlorophenyl)vinyl cyclopropyl ketone [III; Ar is 3,4—$Cl_2C_6H_3$, R is H], 2-(2,4-dichlorophenyl)vinyl cyclopropyl ketone [III; Ar is 2,4—$Cl_2C_6H_3$, R is H], 2-(4-bromophenyl)vinyl cyclopropyl ketone [III; Ar is 4—$BrC_6H_4$, R is H], 2-(4-fluorophenyl)vinyl cyclopropyl ketone [III; Ar is 4—$FC_6H_4$, R is H], 2-(4-trifluoromethoxyphenyl)vinyl cyclopropyl ketone [III; Ar is 4—$F_3COC_6H_4$, R is H], or 2-(4-trifluoromethylphenyl)vinyl cyclopropyl ketone [III; Ar is 4—$F_3CC_6H_4$, R is H].

B. 2-Arylethyl cyclopropyl carbinols (IV) and 2-arylvinyl cyclopropyl carbinols (VII)

B1. 2-(3,4-Methylenedioxyphenyl)ethyl 1-ethylcyclopropyl carbinol [IV; Ar is 3,4-methylenedioxyphenyl, R is $C_2H_5$].

A suspension of 15 g. of lithium aluminum hydride in about 500 ml. of tetrahydrofuran was heated at reflux while a solution of 60 g. of 2-(3,4-methylenedioxyphenyl)vinyl 1-ethylcyclopropyl ketone (Preparation A1 in 150 ml. of tetrahydrofuran was added dropwise over a period of 2–3 hours. The reaction mixture was heated at reflux for 2 hours, cooled, and then water was added very cautiously. Excess anhydrous sodium sulfate was added, the mixture filtered, and the filter cake washed several times with chloroform. The combined filtrate and washings were evaporated to dryness to give 53 g. of an oil consisting of 2-(3,4-methylenedioxyphenyl)ethyl 1-ethylcyclopropyl carbinol.

B2. 2-(3,4-Methylenedioxyphenyl)ethyl cyclopropyl carbinol [IV; Ar is 3,4-methylenedioxyphenyl, R is H] was prepared from 18.4 g. of 2-(3,4-methylenedioxyphenyl)vinyl cyclopropyl ketone (Preparation A2) and 3.1 g. of lithium aluminum hydride according to the procedure described above in Preparation B1, affording 11.5 g., b.p. 116°–122°C. (0.005 mm.), m.p. 64°–65°C. when recrystallized from ether.

B3. 2-(3,4-Methylenedioxyphenyl)ethyl 1-methylcyclopropyl carbinol [IV; Ar is 3,4-methylenedioxyphenyl, R is $CH_3$] was prepared from 23.4 g. of 2-(3,4-methylenedioxyphenyl)vinyl 1-methylcyclopropyl ketone (Preparation A3) and 3.88 g. of lithium aluminum hydride according to the procedure described above in Preparation B1, affording 18.8 g., b.p. 120°–130°C. (0.003 mm.).

B4. 2-(3,4-Dimethoxyphenyl)ethyl 1-ethylcyclopropyl carbinol [IV; Ar is 3,4—$(CH_3O)_2C_6H_3$, R is $C_2H_5$] was prepared from 15 g. of 2-(3,4-dimethoxyphenyl)vinyl 1-ethylcyclopropyl ketone (Preparation A4) and 2.2 g. of lithium aluminum hydride according to the procedure described above in Preparation B1, affording 10 g., b.p. 148°–150°C. (0.01 mm.).

B5. 2-(Methoxyphenyl)ethyl cyclopropyl carbinol [IV; Ar is 4—$CH_3OC_6H_4$, R is H] was prepared from 50 g. of 2-(4-methoxyphenyl)vinyl cyclopropyl ketone (Preparation A5) and 9.7 g. of lithium aluminum hydride according to the procedure described above in Preparation B1, affording 42 g., b.p. 116°–117°C. (0.05 mm.).

B6. 2-(4-Chlorophenyl)ethyl cyclopropyl carbinol [IV; AR is 4—$ClC_6H_4$, R is H] was prepared from 31 g. of 2-(4-chlorophenyl)vinyl cyclopropyl ketone (Preparation A6) and 5.87 g. of lithium aluminum hydride according to the procedure described above in Preparation B1, affording 23.8 g., b.p. 105°–106°C. (0.1 mm.).

B7. 2-(4-Carboxyphenyl)vinyl 1-ethylcyclopropyl carbinol [VII; Ar is 4—$HO_2CC_6H_4$, R is $C_2H_5$]. To a stirred suspension of 34.0 g. of 2-(4-carboxyphenyl)vinyl 1-ethylcyclopropyl ketone (Preparation A7) in 500 ml. of ice water was slowly added 11 g. of sodium borohydride over a 1 hour period. The mixture was stirred for about 16 hours and then cautiously acidified with ice-cold concentrated hydrochloric acid. The solid material was collected by filtration and dissolved in ether. The ether solution was dried over anhydrous magnesium sulfate and concentrated to give 33.2 g. of 2-(4-carboxyphenyl)vinyl 1-ethylcyclopropyl carbinol, m.p. 130°–131°C. when recrystallized from toluene.

B8. 2-(4-Carboxyphenyl)ethyl 1-ethylcyclopropyl carbinol [IV; Ar is 4—$HO_2CC_6H_4$, R is $C_2H_5$]. A solution of 29 g. of 2-(4-carboxyphenyl)vinyl 1-ethylcyclopropyl carbinol (Preparation B7) in 200 ml. of ethanol was hydrogenated in the presence of 1 g. of palladium-on-carbon catalyst. There was thus obtained 28 g. of 2-(4-carboxyphenyl)ethyl 1-ethylcyclopropyl carbinol, colorless crystals, m.p. 116°–117.5°C.

B9. 2-(3,4-Methylenedioxyphenyl)vinyl 1-ethylcyclopropyl carbinol [VII; Ar is 3,4-methylenedioxyphenyl, R is $C_2H_5$]. To a cold solution of 5 g. of 2-(3,4-methylenedioxyphenyl)vinyl 1-ethylcyclopropyl ketone (Preparation A1 in 50 ml. of methanol was added in portions 1.56 g. of sodium borohydride. The mixture was stirred at room temperature for 2 hours, then diluted with water and extracted with ether. The ether extracts were dried and concentrated to give 3.6 g. of 2-(3,4-methylenedioxyphenyl)vinyl 1-ethylcyclopropyl carbinol as a colorless oil.

By replacing the 2-(3,4-methylenedioxyphenyl)vinyl 1-ethylcyclopropyl ketone in Preparation B1 above by a molar equivalent amount of 2-(3,4-methylenedioxyphenyl)vinyl 1-isopropylcycloprpyl ketone, 2-(3,4-methylenedioxyphenyl)vinyl 1-butylcyclopropyl ketone, 2-(3,4-dichlorophenyl)vinyl cyclopropy ketone, 2-(2,4-dichlorophenyl)vinyl cyclopropyl ketone, 2-(4-bromophenyl)vinyl cyclopropyl ketone, 2-(4-fluorophenyl)vinyl cyclopropyl ketone, 2-(4-trifluoromethoxyphenyl)vinyl cyclopropyl ketone or 2-(4-trifluoromethylphenyl)vinyl cyclopropyl ketone there can be obtained, respectively:

2-(3,4-methylenedioxyphenyl)ethyl 1-isopropylcyclopropyl carbinol [IV; Ar is 3,4-methylenedioxyphenyl, R is $(CH_3)_2CH$], 2-(3,4-methylenedioxyhphenyl)ethyl 1-butylcyclopropyl carbinol [IV; Ar is 3,4-methylenedioxyphenyl, R is $CH_3CH_2CH_2CH_2$], 2-(3,4-dichlorophenyl)ethyl cyclopropyl carbinol [IV; Ar is 3,4—$Cl_2C_6H_3$, R is H], 2-(2,4-dichlorophenyl)ethyl cyclopropyl carbinol [IV; Ar is 2,4—$Cl_2C_6H_3$, R is H], 2-(4-bromophenyl)ethyl cyclopropyl carbinol [IV; Ar is 4—$BrC_6H_4$, R is H], 2-(4-fluorophenyl)ethyl cyclopropyl carbinol [IV; Ar is 4—$FC_6H_4$, R is H], 2-(4-trifluoromethoxyphenyl)ethyl cyclopropyl carbinol [IV; Ar is 4—$F_3COC_6H_4$, R is H], or 2-(4-trifluoromethylphenyl)ethyl cyclopropyl carbinol [IV; Ar is 4—$F_3CC_6H_4$, R is H].

C. Arylalkenyl bromides (V, VIII) and arylalkyl bromides (Va)

C1. 3-Ethyl-6-(3,4-methylenedioxyphenyl)-3-hexenyl bromide [V; Ar is 3,4-methylenedioxyphenyl, R is $C_2H_5$]. To a solution of 26.4 g. (0.106 mole) of 2-(3,4-methylenedioxyphenyl)ethyl 1-ethylcyclopropyl carbinol in 250 ml. of ether, cooled to −30°C. under nitrogen, was added 18 ml. of collidine. Lithium bromide (26 g., 0.3 mole) was then added, the mixture cooled to −50°C. and 25 g. (0.09 mole) of phosphorus tribromide was added dropwise. The reaction mixture was stirred at −50°C. for 10 minutes, allowed to warm to 0°C. over a 3 hour period and stirred at 0°C. for 3 hours. Collidine (30 ml.) was added, followed by 10 ml. of water. The reaction mixture was partitioned between water and ether, the ether layer washed with water and sodium chloride solution, and dried over anhydrous magnesium sulfate. The ether solution was concentrated to give an oily product used directly in the following reaction.

The latter product was dissolved in about 200 ml. of anhydrous ether and added in a fine stream to a stirred mixture of 27 g. of zinc bromide in 200 ml. of ether held at −30° to −35°C. The mixture was stirred, then allowed to warm to 0°C. during 2 hours, held there for 30 minutes, and then allowed to warm to room temperature over a 3 hour period and stirred for 2 hours longer. The reaction mixture was partitioned between ether and aqueous sodium chloride. The ether layer was washed three times with 500 ml. of water, then with sodium chloride solution, dried over anhydrous magnesium sulfate and concentrated to remove the solvent. The residue was redissolved in ether, washed with dilute aqueous sodium bicarbonate and with sodium chloride solution, and evaporated to give 23 g. of 3-ethyl-6-(3,4-methylenedioxyphenyl)-3-hexenyl bromide as a straw-colored oil.

C2. 6-(3,4-Methylenedioxyphenyl)-3-hexenyl bromide [V; Ar is 3,4-methylenedioxyphenyl, R is H] was prepared from 11.5 g. of 2-(3,4-methylenedioxyphenyl)ethyl cyclopropyl carbinol (Preparation B2), 12 g. of phosphorus tribromide, 10 g. of lithium bromide and 12.7 g. of zinc bromide according to the procedure given above in Preparation C1, affording 12.5 g. of product as an oil.

C3. 3-Methyl-6-(3,4-methylenedioxyphenyl)-3-hexenyl bromide [V; Ar is 3,4-methylenedioxyphenyl, R is $CH_3$] was prepared from 17.6 g. of 2-(3,4- methylenedioxyphenyl)ethyl 1-methylcyclopropylcarbinol (Preparation B3), 20.3 g. of phosphorus tribromide, 18.5 g. of lithium bromide and 21 g. of zinc bromide according to the procedure given above in Preparation C1, affording 19 g. of product as an oil.

C4. 3-Ethyl-6-(3,4-dimethoxyphenyl)-3-hexenyl bromide [V; Ar is 3,4—(CH$_3$O)$_2$C$_6$H$_3$, R is C$_2$H$_5$] was prepared from 16 g. of 2-(3,4-dimethoxyphenyl)ethyl 1-ethylcyclopropyl carbinol (preparation B4), 16.8 g. of phosphorous tribromide, 16.8 g. of lithium bromide and 17.6 g. of zinc bromide according to the procedure given above in Preparation C1. The product was used directly in the succeeding step (Preparation D4) without isolation.

C5. 6-(4-Methoxyphenyl-3-hexenyl bromide [V; Ar is 4—CH$_3$OC$_6$H$_4$, R is H] was prepared from 38.2 g. of 2-(4-methoxyphenyl)ethyl cyclopropyl carbinol (Preparation B5), 42.5 g. of phosphorus tribromide, 35 g. of lithium bromide and 40 g. of zinc bromide according to the procedure given above in Preparation C1, affording 48 g. of product as an oil.

C6. 6-(4-Chlorophenyl)-3-hexenyl bromide [V; Ar is 4—ClC$_6$H$_4$, R is H] was prepared from 21 g. of 2-(4-chlorophenyl)ethyl cyclopropyl carbinol (Preparation B6), 23 g. of phosphorus tribromide, 18.85 g. of lithium bromide and 22.5 g. of zinc bromide according to the procedure given above in Preparation C1, affording 25.5 g. of product as an oil.

C7. 3-Ethyl-6-(4-carbomethoxyphenyl)-3-hexenyl bromide [V; Ar is 4—CH$_3$O$_2$CC$_6$H$_4$, R is C$_2$H$_5$]. A mixture of 21.3 g. of 2-(4-carboxyphenyl)vinyl 1-ethylcyclopropyl carbinol (Preparation B7) and 500 ml. of methanol saturated with hydrogen chloride at 0°C. was stirred for 1 hour at 0°C. and then allowed to come to room temperature with stirring until the solution was complete. The reaction mixture was concentrated to dryness, the residue taken up in chloroform and washed with water and sodium bicarbonate solution, dried over anhydrous magnesium sulfate and concentrated to give 24.4 g. of a light yellow oil. The latter product was dissolved in a small quantity of ether and added to a solution of 700 g. of zinc bromide in 4 liters of anhydrous ether. The reaction mixture was stirred for 20 hours, then washed with water, dried over anhydrous magnesium sulfate and the solvent evaporated, affording 17.5 g. of 3-ethyl-6-(4-carbomethoxyphenyl)-3-hexenylbromide as a light yellow oil.

C8. 3-Ethyl-6-(3,4-methylenedioxyphenyl)-3,5-hexadienyl bromide VIII; Ar is 3,4-methylenedioxyphenyl, R is C$_2$H$_5$] was prepared from 3.6 g. of 2-(3,4-methylenedioxyphenyl)vinyl 1-ethylcyclopropyl carbinol (Preparation B9), 3.5 g. of phosphorus tribromide, 4.5 g. of lithium bromide and 3.5 g. of phosphorus tribromide, 4.5 g. of lithium bromide and 3.5 g. of zinc bromide according to the procedure given above in Preparation C1, affording 2 g. of product as an oil.

C9. 6-(4-methoxyphenyl)hexyl bromide [Va; Ar is 4—CH$_3$OC$_6$H$_4$, R is H]. A mixture of 18.6 g. of 6-(4-methoxyphenyl)-3-hexenyl bromide (Preparation C5) and 0.21 g. of platinum oxide catalyst in 200 ml. of isopropyl alcohol was hydrogenated until 1 mole equivalent of hydrogen had been absorbed. The product was isolated and distilled to give 12.8 g. of 6-(4-methoxyphenyl)hexyl bromide, b.p. 126°–128°C. (0.04 mm.).

C10. 6-(4-Chlorophenyl)hexyl bromide [Va; Ar is 4—ClC$_6$H$_4$, R is H] was prepared by hydrogenation of 25.2 g. of 6-(4-chlorophenyl)-3-hexenyl bromide (Preparation C6) according to the procedure described above in Preparation C9, affording 17 g., b.p. 110°–111°C. (0.02 mm.).

By replacing the 2-(3,4-methylenedioxyphenyl)ethyl 1-ethylcyclopropy carbinol in Preparation C1by a molar equivalent amount of 2-(3,4-methylenedioxyphenyl)ethyl 1-isopropylcyclopropyl carbinol, 2-(3,4-methylenedioxyphenyl)ethyl 1-butylcyclopropyl carbinol, 2-(3,4-dichlorophenyl)ethyl cyclopropyl carbinol, 2-(2,4-dichlorophenyl)ethyl cyclopropyl carbinol, 2-(4-bromophenyl)ethyl cyclopropyl carbinol, 2(4-fluorophenyl)ethyl cyclopropyl carbinol, 2-(4-trifluoromethoxyphenyl)ethyl cyclopropyl carbinol or 2-(4-trifluoromethylphenyl)ethyl cyclopropyl carbinol there can be obtained, respectively:

3-isopropyl-6-(3,4-methylenedioxyphenyl)-3-hexenyl bromide [V; Ar is 3,4-methylenedioxyphenyl, R is (CH$_3$)$_2$CH], 3-butyl-6-(3,4-methylenedioxyphenyl)-3-hexenyl bromide [V; Ar is 3,4-methylenedioxyphenyl, R is CH$_3$CH$_2$CH$_2$CH$_2$], 6-(3,4-dichlorophenyl)-3-hexenyl bromide [V; Ar is 3,4—Cl$_2$C$_6$H$_3$, R is H], 6-(2,4-dichlorophenyl)-3-hexenyl bromide [V; Ar is 2,4—Cl$_2$C$_6$H$_3$, R is H], 6-(4-bromophenyl)-3-hexenyl bromide [V; Ar is 4—BrC$_6$H$_4$, R is H], 6-(4-fluorophenyl)-3-hexenyl bromide [V; Ar is 4—FC$_6$H$_4$, R is H], 6-(4-trifluoromethoxyphenyl)-3-hexenyl bromide [V; Ar is 4—F$_3$COC$_6$H$_4$, R is H], or 6-(4-trifluoromethylphenyl)-3-hexenyl bromide [V; Ar is 4—F$_3$CC$_6$H$_4$, R is H].

The latter products can be hydrogenated according to the procedure of Preparation C9 to give, respectively:

3-isopropyl-6-(3,4-methylenedioxyphenyl)hexyl bromide [Va; Ar is 3,4-methylenedioxyphenyl, R is (CH$_3$)$_2$CH], 3-butyl-6-(3,4-methylenedioxyphenyl)hexyl bromide [Va; Ar is 3,4-methylenedioxyphenyl, R is CH$_3$CH$_2$CH$_2$CH$_2$], 6-(3,4-dichlorophenyl)hexyl bromide [Va; Ar is 3,4—Cl$_2$C$_6$H$_3$, R is H], 6-(2,4-dichlorophenyl)hexyl bromide [Va; Ar is 2,4—Cl$_2$C$_6$H$_3$, R is H], 6-(4-bromophenyl)hexyl bromide [Va; Ar is 4-BrC$_6$H$_4$, R is H], 6-(4-fluorophenyl)hexyl bromide [Va; Ar is 4-FC$_6$H$_4$, R is H], 6-(4-trifluoromethoxyphenyl)hexyl bromide [Va; Ar is 4—F$_3$COC$_6$H$_4$, R is H], or 6-(4-trifluoromethylphenyl)hexyl bromide [Va; Ar is 4—F$_3$CC$_6$H$_4$, R is H].

D. Aryalkenyl iodides (VI, IX) and arylalkyl iodides (VIa)

D1. 3-Ethyl-6-(3,4-methylenedioxyphenyl)-3-hexenyl iodide [VI; Ar is 3,4-methylenedioxyphenyl, R is C$_2$H$_5$]. A mixture of 23 g. of 3-ethyl-6-(3,4-methylenedioxyphenyl)-3-hexenyl bromide (Preparation C1) and 30 g. of powdered potassium iodide in 250 ml. of dimethylformamide was stirred for about 16 hours. The reaction mixture was concentrated to remove the solvent and the residue partitioned between cyclohexane and water. The cyclohexane layer was separated, dried over anhydrous magnesium sulfate and evaporated to give 33.0 g. of 3-ethyl-6-(3,4-methylenedioxyphenyl)-3-hexenyl iodide as a light yellow oil.

D2. 6-(3,4-Methylenedioxyphenyl)-3-hexenyl iodide [VI; Ar is 3,4-methylenedioxyphenyl, R is H] was prepared from 12.9 g. of 6-(3,4-methylenedioxyphenyl)-3-hexenyl bromide (Preparation C2) and 7 g. of sodium iodide in 120 ml. of acetone, refluxed for 3 hours, affording 12.5 g. of product as an oil.

D3. 3-Methyl-6-(3,4-methylenedioxyphenyl)-3-hexenyl iodide [VI; Ar is 3,4-methylenedioxyphenyl, R is $CH_3$] was prepared from 19.0 g. of 3-methyl-6-(3,4-methylenedioxyphenyl)-3-hexenyl bromide (Preparation C3) and 10.5 g. of sodium iodide in 125 ml. of acetone, to give 21 g. of product as a yellow oil.

D4. 3-Ethyl-6-(3,4-dimethoxyphenyl)-3-hexenyl iodide [VI; Ar is 3,4—$(CH_3O)_2C_6H_3$, R is $C_2H_5$] was prepared from 13.8 g. of 3-ethyl-6-(3,4-dimethoxyphenyl)-3-hexenyl bromide (Preparation C4) and 9 g. of sodium iodide in 120 ml. of acetone, to give 15 g. of product as an oil.

D5. 6-(4-Methoxyphenyl)-3-hexenyl iodide [VI; Ar is 4-$CH_3OC_6H_4$, R is H] was prepared from 24 g. of 6-(4-methoxyphenyl)-3-hexenyl bromide (Preparation C5) and 14.75 g. of sodium iodide in 475 ml. of 2-butanone, to give 28.5 g. of product as an oil.

D6. 6-(4-Methoxyphenyl)hexyl iodide [VIa; Ar is 4—$CH_3OC_6H_4$, R is H] was prepared from 16.3 g. of 6-(4-methoxyphenyl)hexyl bromide (Preparation C9) and 9.93 g. of sodium iodide in 325 ml. of 2-butanone, to give 19.3 g. of product as a pale yellow oil.

D7. 6-(4-Chlorophenyl)hexyl iodide [VIa; Ar is 4—$ClC_6H_4$, R is H] was prepared from 17 g. of 6-(4-chlorophenyl)hexyl bromide (Preparation C10) and 10.2 g. of sodium iodide in 325 ml. of acetone, to give 21 g. of product as an oil.

D8. 3-Ethyl-6-(4-carbomethoxyphenyl)-3-hexenyl iodide [VI; Ar is 4—$CH_3O_2CC_6H_4$, R is $C_2H_5$] was prepared from 17.5 g. of 3-ethyl-6-(4-carbomethoxyphenyl)-3-hexenyl bromide (Preparation C7) and 17.5 g. of sodium iodide in 200 ml. of acetone, to give 14 g. of product as an oil.

D9. 3-Ethyl-6-(3,4-methylenedioxyphenyl)-3,5-hexadienyl iodide [IX; Ar is 3,4-methylenedioxyphenyl, R is $C_2H_5$] was prepared from 10 g. of 3-ethyl-6-(3,4-methylenedioxyphenyl)-3,5-hexadienyl bromide (Preparation C8) and 6 g. of sodium iodide in 120 ml. of acetone, to give 10.5 g. of product as an oil.

By similar procedures 3-isopropyl-6-(3,4-methylenedioxyphenyl)hexyl bromide, 3-butyl-6-(3,4-methylenedioxyphenyl)hexyl bromide, 6-(3,4-dichlorophenyl)hexyl bromide, 6-(2,4-dichlorophenyl)hexyl bromide, 6-(4-bromophenyl)hexyl bromide, 6-(4-fluorophenyl)hexyl bromide, 6-(4-trifluoromethoxyphenyl)hexyl bromide, or 6-(4-trifluoromethylphenyl)hexyl bromide can be caused to react with sodium iodide to give, respectively:

3-isopropyl-6-(3,4-methylenedioxyphenyl)hexyl iodide [VIa; Ar is 3,4-methylenedioxyphenyl, R is $(CH_3)_2CH$], 3-butyl-6-(3,4-methylenedioxyphenyl)hexyl iodide [VIa; Ar is 3,4-methylenedioxyphenyl, R is $CH_3CH_2CH_2CH_2$], 6-(3,4-dichlorophenyl)hexyl iodide [VIa; Ar is 3,4—$Cl_2C_6H_3$, R is H], 6-(2,4-dichlorophenyl)hexyl iodide [VIa; Ar is 2,4—$Cl_2C_6H_3$, R is H], 6-(4-bromophenyl)hexyl iodide [VIa; Ar is 4—$BrC_6H_4$, R is H], 6-(4-fluorophenyl)hexyl iodide [VIa; Ar is 4—$FC_6H_4$, R is H], 6-(4-trifluoromethoxyphenyl)hexyl iodide [VIa; Ar is 4—$F_3COC_6H_4$, R is H], or 6-(4-trifluoromethylphenyl)hexyl iodide [VIa; Ar is 4—$F_3CC_6H_4$, R is H].

EXAMPLE 1

3-Ethyl-6-(3,4-methylenedioxyphenyl)-3-hexenyl dl-2,2-dimethyl-3-(2-methyl-1-propenyl)cyclopropanecarboxylate [I; R' is 2,2-dimethyl-3-(2-methyl-1-propenyl)cyclopropyl, Y is $C(C_2H_5)=CHCH_2CH_2$, Ar is 3,4-methylenedioxyphenyl]

To a solution of 7.05 g. of dl-chrysanthemic acid in 25 ml. of methanol was added a solution of 2.70 g. of potassium hydroxide (87%) in 75 ml. of methanol. The resulting solution was concentrated to dryness, and to the residue of potassium dl-chrysanthemate was added a solution of 15 g. of 3-ethyl-6-(3,4-methylenedioxyphenyl)-3-hexenyl iodide (Preparation D1) in 100 ml. of dimethylformamide. The reaction mixture was warmed at 45°C. for 2½ days and then concentrated to remove the organic solvents. The residue was partitioned between water and ether, and the ether layer was washed with dilute sodium hydroxide solution, dried over anhydrous magnesium sulfate and concentrated. The residue was chromatographed on a column of silica gel and the column eluted with pentane containing increasing amounts of benzene. Fractions obtained with benzenepentane 7:3 provided 9.6 g. of 3-ethyl-6-(3,4-methylenedioxyphenyl)-3-hexenyl dl-2,2-dimethyl-3-(2-methyl-1-propenyl)cyclopropanecarboxylate as a light yellow oil.

Anal. Calcd. for $C_{25}H_{34}O_4$: C, 75.34; H, 8.60.
Found: C, 75.62; H, 8.73.

Infrared (IR) (oil film) $\lambda_\mu^{max}$ 3.45s + shldrs. (CH); 5.82s (C=O); 6.03w, 6.24wm, 6.67s, 6.74s, 6.95s (unsatn. + CH).

Nuclear Magnetic Resonance (NMR) [20% $CDCl_3$, internal tetramethylsilane (TMS)]$\delta$ ppm (Ratio) 6.75(3) (arom); 5.95(2) O—$CH_2$—O); 4.8–5.6(2) (=CH); 4.15(2) (COO—$CH_2$—); 1.8–2.8(9) ($CH_2 \times 4$ +CH—C=O); 0.7–1.8(16) (cyclopropyl) CH + 5 Me).

3-Ethyl-6-(3,4-methylenedioxyphenyl)-3-hexenyl dl-2,2-dimethyl-3-(2-methyl-1-propenyl)cyclopropanecarboxylate was found to have minimum inhibitory concentrations in vitro against rhino-2, equine rhino and respiratory syncitial virus of 0.6, 6 and 12 micrograms per milliliter, respectively.

EXAMPLE 2

3-Ethyl-6-(3,4-methylenedioxyphenyl)-3-hexenyl acetate [I; R' is $CH_3$, Y is $C(C_2H_5)=CHCH_2CH_2$, Ar is 3,4-methylenedioxyphenyl]

A mixture of 12.7 g. of 3-ethyl-6-(3,4-methylenedioxyphenyl)-3-hexenyl iodide (Preparation D1) and 3.5 g. of potassium acetate in 75 ml. of dimethylformamide was warmed at 45°C. for about 16 hours. The reaction mixture was filtered and concentrated to remove the solvent. The residue was partitioned between water and ether, and the ether solution was concentrated. The residue was distilled at 127°–130°C. (0.005 mm.) and then chromatographed on a column of silica gel. The column was eluted with pentane containing increasing amounts of benzene. Fractions obtained with benzene-pentane 6:4 provided 5 g. of 3-ethyl-6-(3,4-methylenedioxyphenyl)-3-hexenyl acetate as an amber oil.

Anal. Calcd. for $C_{17}H_{22}O_4$: C, 70.32; H, 7.64.
Found; C, 70.19; H, 7.71.

IR (1/2% KBr) $\lambda\ ^{m\mu x}_\mu$ 3.45s + shldrs. (CH); 5.79s (C=O); 6.25m 6.67mss, 6.74s, 6.95s (arom + CH).

NMR (20% $CDCl_3$, internal TMS) δ ppm (Ratio) 6.73(3) (arom); 5.92(2) (O—$CH_2$—O); 5.22(1) (=CH); 4.13(2) ($COOCH_2$—); 1.7–2.8(11) (aliph. CH + $CH_3$—C=O-); 0.92(3) (Me triplet).

3-Ethyl-6-(3,4-methylenedioxyphenyl)-3-hexenyl acetate was found to have a minimum inhibitory concentration in vitro against rhino-2 and para-influenza virus of 2.5 micrograms per milliliter.

3-Ethyl-6-(3,4-methylenedioxyphenyl)-3-hexenyl acetate was found to be pesticidal against dock beetle larvae at a concentration of 20 micrograms per insect.

EXAMPLE 3

3-Ethyl-6-(3,4-methylenedioxyphenyl)-3-hexenyl 3-methylcrotonate [I; R' is $(CH_3)_2C$=CH, Y is $C(C_2H_5)$=$CHCH_2CH_2$, Ar is 3,4-methylenedioxyphenyl]

A mixture of 17.9 g. of 3-ethyl-6-(3,4-methylenedioxyphenyl)-3-hexenyl iodide (Preparation D1) and 6.1 g. of sodium 3,3-dimethylacrylate in 150 ml. of dimethylformamide was heated at 52°C. for 3 hours and then stirred at 40°C. for 2½ days. The reaction mixture was concentrated in vacuo and the residue partitioned between water and ether. The ether was dried over anhydrous magnesium sulfate, concentrated, and the residue (21 g.) chromatographed on silica gel. The chromatograph column was eluted with pentane containing increasing amounts of benzene. Fractions obtained with pentane-benzene 8:2 gave 6.2 g. of 3-ethyl-6-(3,4-methylenedioxyphenyl)-3-hexenyl 3-methylcrotonate as a light yellow oil.

Anal. Calcd. for $C_{20}H_{26}O_4$; C, 72.70; H,7.93.
Found: C, 72.71; H, 8.09.

IR (oil film) $\lambda\ ^{max}_\mu$ 3.45ms + shldrs. (CH); 5.86s (conj. COOR); 6.09m (C=C); 6.25w, 6.68ms, 6.74s, 6.96s (arom + CH). NMR (20% $CDCl_3$, internal TMS) δ ppm (Ratio) 6.74(3) (arom); 5.90(2) (O—$CH_2$—O); 5.70, 5.22(2⁻) (=CH × 2); 4.15(2⁻) ($COOCH_2$); 1.7–2.8(14⁻) ($Me_2$—C=, $CH_2$); 0.9(3–4) (Me triplet).

3-Ethyl-6-(3,4-methylenedioxyphenyl)-3-hexenyl 3-methylcrotonate was found to have minimum inhibitory concentrations in vitro against rhino-2, equine rhino and para-influenza virus of 3, 12 and 12 micrograms per milliliter, respectively.

3-Ethyl-6-(3,4-methylenedioxyphenyl)-3-hexenyl 3-methylcrotonate was found to have pesticidal activity when tested against yellow mealworm pupae (tenebrio) at a concentration of 100 micrograms per insect, against dock beetle larvae at 20 micrograms per insect, and against rhodnius prolixus nymph at 100 micrograms per insect.

EXAMPLE 4

3-Methyl-6-(3,4-methylenedioxyphenyl)-3-hexenyl formate [I; R' is H, y is $C(CH_3)$=$CHCH_2CH_2$, Ar is 3,4-methylenedioxyphenyl] is prepared by treating 3-methyl-6-(3,4-methylenedioxyphenyl)-3-hexenyl iodide (Preparation D3) and potassium formate according to the procedure of Example 2. The compound is obtained in the form of a light yellow mobile oil.

IR (oil film) $\lambda\ ^{max}_\mu$ 3.45mms (CH); 5.82s (C=O); 6.25ws, 6.66ms, 6.73ms, 6.95ms (arom + CH).

3-Methyl-6-(3,4-methylenedioxyphenyl)-3-hexenyl formate was found to have pesticidal activity when tested against dock beetle larvae at a concentration of 20 micrograms per insect, against rhodnius prolixus nymph at 100 micrograms per insect, and against dock beetle eggs at 100 ppm.

EXAMPLE 5

3-Ethyl-6-(3,4-methylenedioxyphenyl)-3-hexenyl piperonylate [I; R' and Ar are 3,4-methylenedioxyphenyl, Y is $C(C_2H_5)$=$CHCH_2CH_2$]

A mixture of 32.7 g. of 3-ethyl-6-(3,4-methylenedioxyphenyl)-3-hexenyl iodide (Preparation D1) and 18.8 g. of sodium piperonylate in 400 ml. of dimethylformamide was warmed at 50°C. for about 16 hours. The product was isolated and chromatographed on a column of silica gel. The column was eluted with chloroform-ether 8:2 to give 19.95 g. of 3-ethyl-6-(3,4-methylenedioxyphenyl)-3-hexenyl piperonylate as a light yellow oil.

Anal. Calcd. for $C_{23}H_{24}O_6$: C, 69.88; H, 6.10.
Found: C, 69.50; H,6.19.

IR (oil film) $\lambda\ ^{m\mu x}_\mu$ 3.45s + shldrs. (CH); 5.86s (conj. —C=O-OR); 6.18m, 6.25mms, 6.67s, 6.67s, 6.74s, 6.95s (unsat. C=C, arom, CH).

NMR (20% $CDCl_3$, internal TMS) δ ppm (Ratio) 6.6–7.8(6) (arom); 6.02, 5.90(4) (O—$CH_2$—O × 2); 5.28(1) (=CH—); 4.35(2) (COO—$CH_2$); 1.83–2.77(8) ($CH_2$ × 4); 0.95(3) (Me triplet).

3-Ethyl-6-(3,4-methylenedioxyphenyl)-3-hexenyl piperonylate was found to have pseticidal activity when tested againt dock beetle larvae at a concentration of 20 micrograms per insect, against mosquito larvae at 6.6 ppm., and against salt marsh caterpillar eggs at 100 ppm.

According to the methods of the preceding examples, 3-ethyl-6-(3,4-methylenedioxyphenyl)-3-hexenyl iodide (Preparation D1) can be caused to react with potassium cyclohexanecarboxylate, potassium cyclohex-2-enecarboxylate, potassium undecanoate or potassium 3-cyclopentylpropionate to produce, respectively:

3-ethyl-6-(3,4-methylenedioxyphenyl-3-hexenyl cyclohexanecarboxylate [I; R' is cyclohexyl, Y is $C(C_2H_5)$=$CHCH_2CH_2$, Ar is 3,4-methylenedioxyphenyl];

3-ethyl-6-(3,4-methylenedioxyphenyl)3-hexenyl cyclohex-2-enecarboxylate [I; R' is cyclohex-2-ene, Y is $C(C_2H_5)$=$CHCH_2CH_2$, Ar is 3,4-methylenedioxyphenyl];

3-ethyl-6-(3,4-methylenedioxyphenyl)-3-hexenyl undecanoate [I; R' is $CH_3(CH_2)_{10}$, Y is $C(C_2H_5)$=$CHCH_2CH_2$, Ar is 3,4-methylenedioxyphenyl]; or 3-ethyl-6-(3,4-methylenedioxyphenyl)-3-hexenyl 3-cyclopentylpropionate [I; R' is cyclopentyl—$CH_2CH_2$, Y is $C(C_2H_5)$=$CHCH_5CH_2$, Ar is 3,4-methylenedioxyphenyl].

According to the methods of the foregoing examples, the following iodide intermediates: 6-(3,4-methylenedioxyphenyl)-3-hexenyl iodide (Preparation D ), 3-ethyl-6-(3,4-dimethoxyphenyl)-3-hexenyl iodide (Preparation D4); 6-(4-methoxyphenyl)-3-hexenyl iodide (Preparation D5); 6-(4-methoxyphenyl)hexyl iodide (Preparation D6); 6-(4-chlorophenyl)hexyl iodide (Preparation D7); 3-ethyl-6-(4-carbomethoxyphenyl)-3-hexenyl iodide (Preparation D8); 3-ethyl-6-(3,4-methylenedioxyphenyl)-3,5- hexadienyl iodide (Preparation D9); 3-isopropyl-6-(3,4-methylenedioxyphenyl)hexyl iodide; 3-butyl-6-(3,4-methylenedioxyphenyl)hexyl iodide; 6-(3,4-dichlorophenyl)hexyl iodide; 6-(2,4-dichlorophenyl)hexyl iodide; 6-(4-bromophenyl)hexyl iodide; 6-(4-fluorophenyl)hexyl iodide; 6-(4-trifluoromethoxyphenyl)hexyl iodide; and 6-(4-trifluoromethylphenyl)hexyl iodide can be caused to react with potassium acetate to give, respectively:

6-(3,4-methylenedioxyphenyl)-3-hexenyl acetate [I; R' is $CH_3$, Y is $CH=CHCH_2CH_2$, Ar is 3,4-methylenedioxyphenyl];

3-ethyl-6-(3,4-dimethoxyphenyl)-3-hexenyl acetate [I; R' is $CH_3$, Y is $C(C_2H_5)=CHCH_2CH_2$, Ar is 3,4—$(CH_3O)_2C_6H_3$];

6-(4-methoxyphenyl)-3-hexenyl acetate [I; R' is $CH_3$, Y is $CH=CHCH_2CH_2$, Ar is 4—$CH_3OC_6H_4$];

6-(4-methoxyphenyl)hexyl acetate [I; R' is $CH_3$, Y is $CH_2CH_2CH_2CH_2$, Ar is 4—$CH_3OC_6H_4$];

6-(4-chlorophenyl)hexyl acetate [I; R' is $CH_3$, Y is $CH_2CH_2CH_2CH_2$, Ar is 4—$ClC_6H_4$];

3-ethyl-6-(4-carbomethoxyphenyl)-3-hexenyl acetate [I; R' is $CH_3$, Y is $C(C_2H_5)=CHCH_2CH_2$, Ar is 4—$CH_3O_2CC_6H_4$];

3-ethyl-6-(3,4-methylenedioxyphenyl)-3,5-hexadienyl acetate [I; R' is $CH_3$, Y is $C(C_2H_5)=CHCH=CH-$, Ar is 3,4-methylenedioxyphenyl];

3-isopropyl-6-(3,4-methylenedioxyphenyl)hexyl acetate [I; R' is $CH_3$, Y is $C(iso-Pr)=CHCH_2CH_2$, Ar is 3,4-methylenedioxyphenyl];

3-butyl-6-(3,4-methylenedioxyphenyl)hexyl acetate [I; R' is $CH_3$, Y is $C(n-Bu)=CHCH_2CH_2$, Ar is 3,4-methylenedioxyphenyl ];

6-(3,4-dichlorophenyl)hexyl acetate [I; R' is $CH_3$, Y is $CH_2CH_2CH_2 CH_2$, Ar is 3,4—$Cl_2C_6H_3$];

6-(2,4-dichlorophenyl)hexyl acetate [I; R' is $CH_3$, Y is $CH_2CH_2CH_2CH_2$, Ar is 2,4—$Cl_2C_6H_3$];

6-(4-bromophenyl)hexyl acetate [I; R' is $CH_3$, Y is $CH_2CH_2CH_2CH_2$, Ar is 4—$BrC_6H_4$];

6-(4-fluorophenyl)hexyl acetate [I; R' is $CH_3$, Y is $CH_2CH_2CH_2CH_2$, Ar is 4—$FC_6H_4$];

6-(4-trifluoromethoxyphenyl)hexyl acetate [I; R' is $CH_3$, Y is $CH_2CH_2CH_2CH_2$, Ar is 4—$F_3COC_6H_4$]; and 6-(4-trifluoromethylphenyl)hexyl acetate [I; R' is $CH_3$, Y is $CH_2CH_2CH_2CH_2$, Ar is 4—$F_3CC_6H_4$].

EXAMPLE 6

3,4-Epoxy-3-ethyl-6-(3,4-methylenedioxyphenyl)hexyl acetate.

To a solution of 9.47 g. (0.0326 mole) of 3-ethyl-6-(3,4-methylenedioxyphenyl)-3-hexenyl acetate (Example 2) in 50 ml. of anhydrous methylene dichloride was added a solution of 6.1 g. (0.033 mole) of m-chloroperbenzoic acid in 150 ml. of anhydrous methylene dichloride over a period of 30 minutes with occasional cooling of the mixture in an ice bath. The reaction mixture was stirred for 2 hours at room temperature and then sodium bisulfite solution was added until the excess peracid had been destroyed (iodide test). The methylene dichloride solution was washed with 5% aqueous sodium carbonate and water, dried over anhydrous magnesium sulfate and concentrated in vacuo. The residue (9.4 g. of yellow oil) was combined with 5 g. of another run and chromatographed on a column of 280 g. of silica gel. The column was eluted with the pentane-benzene-ether solvent series. Fractions from benzene-ether 8:2 brought out the desired product, 10.5 g. of 3,4-epoxy-3-ethyl-6-(3,4-methylenedioxyphenyl)hexyl acetate as a light yellow oil.

Anal. Calcd. for $C_{17}H_{22}O_5$: C, 66.65; H, 7.24. Found: C, 66.35; H, 7.20.

IR (oil film) λ $^{max}_{\mu}$ 3.45ms + shldrs. (CH); 5.79s (COOR); 6.26wm, 6.67ms, 6.74s, 6.96ms (arom + CH).

3,4-Epoxy-3-ethyl-6-(3,4-methylenedioxyphenyl)hexyl acetate was found to have pesticidal activity when tested against dock beetle eggs at a concentration of 100 ppm.

According to the foregoing procedure of Example 6, 3-ethyl-6-(3,4-methylenedioxyphenyl)-3-hexenyl piperonylate; 3-ethyl-6-(3,4-methylenedioxyphenyl)-3-hexenyl cyclohexanecarboxylate; 3-ethyl-6-(3,4-methylenedioxyphenyl)-3-hexenyl undecanoate; 3-ethyl-6-(3,4-methylenedioxyphenyl)-3-hexenyl 3-cyclopentylpropionate; 6-(3,4-methylenedioxyphenyl)-3-hexenyl acetate; 3-ethyl-6-(3,4-dimethoxyphenyl)-3-hexenyl acetate; 6-(4-methoxyphenyl)-3-hexenyl acetate; or 3-ethyl-6-(4-carbomethoxyphenyl)-3-hexenyl acetate can be caused to react with m-chloroperbenzoic acid to give, respectively, 3,4-epoxy-3-ethyl-6-(3,4-methylenedioxyphenyl)hexyl piperonylate; 3,4-epoxy-3-ethyl-6-(3,4-methylenedioxyphenyl)hexyl cyclohexanecarboxylate, 3,4-epoxy-3-ethyl-6-(3,4-methylenedioxyphenyl)hexyl undecanoate; 3,4-epoxy-3-ethyl-6-(3,4-methylenedioxyphenyl)hexyl 3-cyclopentylpropionate; 3,4-epoxy-6-(3,4-methylenedioxyphenyl)hexyl acetate; 3,4-epoxy-3-ethyl-6-(3,4-dimethoxyphenyl)hexyl acetate; 3,4-epoxy-6-(4-methoxyphenyl)hexyl acetate; or 3,4-epoxy-3-ethyl-6-(4-carbomethoxyphenyl)hexyl acetate.

We claim:

1. A compound of the formula $$R'\overset{O}{\overset{\|}{C}}-O-CH_2CH_2-Y-Ar$$

wherein

Y is selected from the group consisting of

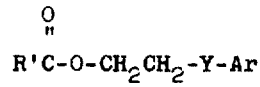

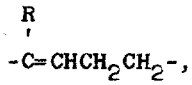

and

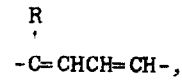

R' is hydrogen, 3,4-methylenedioxyphenyl or a saturated or mono-olefinic hydrocarbon moiety having from 1 to 10 carbon atoms selected from the group consisting of alkyl, alkenyl, cycloalkyl, cycloalkenyl, alkylcycloalkyl, alkylcycloalkenyl and alkenylcycloalkyl, R is hydrogen or lower-alkyl of 1 to 4 carbon atoms; and Ar is phenyl substituted by 3,4-methylenedioxy or one or two monovalent substitutents selected from the group consisting of carbo-lower-alkoxy of 2 to 4 carbon atoms, halogen, trifluoromethyl and trifluoromethoxy.

2. A compound according to claim 1 wherein Y is —C(R)=CHCH$_2$CH$_2$— Ar is 3,4-methylenedioxyphenyl.

3. 3-Ethyl-6-(3,4-methylenedioxyphenyl)-3-hexenyl dl-2,2-dimethyl-3-(2-methyl-1-propenyl)cyclopropanecarboxylate, according to claim 2.

4. 3-Ethyl-6-(3,4-methylenedioxyphenyl)-3-hexenyl acetate, according to claim 2.

5. 3-Ethyl-6-(3,4-methylenedioxyphenyl)-3-hexenyl 3-methylcrotonate, according to claim 2.

6. 3-Methyl-6-(3,4-methylenedioxyphenyl)-3-hexenyl formate, according to claim 2.

7. 3-Ethyl-6-(3,4-methylenedioxyphenyl)-3-hexenyl piperonylate, according to claim 2.

* * * * *